(12) United States Patent
Ouali et al.

(10) Patent No.: US 7,279,542 B2
(45) Date of Patent: Oct. 9, 2007

(54) POLYMERIC PARTICLES AND FRAGRANCE DELIVERY SYSTEMS

(75) Inventors: Lahoussine Ouali, Vetraz-Monthoux (FR); Djamila Latreche, Bonneville (FR)

(73) Assignee: Firmenich SA, Geneva (CH)

( * ) Notice: Subject to any disclaimer, the term of this patent is extended or adjusted under 35 U.S.C. 154(b) by 23 days.

(21) Appl. No.: 11/147,632

(22) Filed: Jun. 7, 2005

(65) Prior Publication Data

US 2005/0238608 A1 Oct. 27, 2005

Related U.S. Application Data

(63) Continuation of application No. PCT/IB2004/000200, filed on Jan. 22, 2004.

(30) Foreign Application Priority Data

Jan. 29, 2003 (EP) .................. 03001871

(51) Int. Cl.
*C08F 20/02* (2006.01)
*C08F 20/10* (2006.01)

(52) U.S. Cl. .................. 526/317.1; 526/318; 526/227; 526/223; 525/330.2; 525/330.3; 521/29; 521/38

(58) Field of Classification Search ............. 525/330.2, 525/330.3; 526/317.1, 318, 227, 223; 521/29, 521/38
See application file for complete search history.

(56) References Cited

U.S. PATENT DOCUMENTS

| | | | | |
|---|---|---|---|---|
| 3,666,733 A | | 5/1972 | Epton | .................. 260/80.3 N |
| 3,964,973 A | * | 6/1976 | Hradil et al. | ................ 435/180 |
| 4,010,038 A | | 3/1977 | Iwasaki et al. | ................ 106/22 |
| 5,071,904 A | | 12/1991 | Martin et al. | ................ 524/458 |
| 5,856,409 A | * | 1/1999 | Ziemelis et al. | ......... 525/330.2 |
| 6,194,375 B1 | * | 2/2001 | Ness et al. | ...................... 512/4 |
| 6,329,057 B1 | * | 12/2001 | Dungworth et al. | ........ 428/403 |
| 6,607,714 B1 | | 8/2003 | Dupuis et al. | ............. 424/70.1 |
| 2002/0028201 A1 | | 3/2002 | Bucha et al. | ............. 424/140.1 |
| 2003/0181540 A1 | * | 9/2003 | Quellet et al. | .............. 523/102 |

FOREIGN PATENT DOCUMENTS

| | | | |
|---|---|---|---|
| CH | 615 446 | | 1/1980 |
| DE | 2014112 | | 11/1970 |
| EP | 0 908 174 A2 | | 4/1999 |
| EP | 1 146 057 A1 | | 10/2001 |
| FR | 2.216.298 | | 8/1974 |
| FR | 2 738.835 | | 3/1997 |
| GB | 1 538 386 | | 1/1999 |
| JP | 2000-143483 | * | 5/2000 |
| WO | WO95/27473 | | 10/1995 |
| WO | WO98/46648 | | 10/1998 |

OTHER PUBLICATIONS

Katharina Landfester, et al, "Miniemulsion Polymerization with Cationic and Nonionic Surfactants: A Very Efficient Use of Surfactants for Heterophase Polymerization", Macromolecules, vol. 32, No. 8, pp. 2679-2683 (1999).
XP-002246506—Abstract of Japanese Patent Application 200-407080.

* cited by examiner

*Primary Examiner*—Ling-Sui Choi
(74) *Attorney, Agent, or Firm*—Winston & Strawn LLP

(57) ABSTRACT

Polymeric micro- and nano-capsules formed of a spherical single hydrophobic polymer, chemically functionalised at their surface so as to comprise hydrophilic moieties thereon are disclosed. The capsules are susceptible of absorbing a perfume and of being optionally coated with an amphiphilic copolymer. They allow the preparation of perfume delivery systems, which provide a slow release of perfuming materials while improving the substantivity of the perfume on a substrate.

18 Claims, 2 Drawing Sheets

POLYMERIC PARTICLES AND FRAGRANCE DELIVERY SYSTEMS

CROSS-REFERENCE TO RELATED APPLICATIONS

This application is a continuation of International application PCT/IB2004/000200 filed 22 Jan. 2004, the entire content of each of which is expressly incorporated herein by reference thereto.

TECHNICAL FIELD

The present invention relates to the field of perfumery. It concerns more particularly polymeric particles, formed of a spherical single hydrophobic polymer which has been chemically functionalised at its surface, so as to comprise hydrophilic moieties thereon, thus being capable of absorbing a perfuming ingredient or composition, in order to provide an efficient perfume delivery system. The delivery system of the invention can be advantageously used to impart a long lasting delivery of volatile odour notes on a substrate.

BACKGROUND ART

The perfume and flavour industries mainly deal with ingredients which are known to be labile and volatile. The most volatile perfuming materials, also referred to as "top notes", responsible for the first impact and freshness effect of a perfume, are the first to be lost during the manufacturing, storage and use of perfumes or perfumed consumer products. Therefore, the success of a perfume lies, not only in its olfactory identity, but also in its stability, as such as well as in consumer products.

Encapsulation techniques have been widely described in the prior art and used to a large extent, first of all as a means to improve the stability of volatile and labile ingredients such as fragrances or flavours, by protecting them from all kinds of possible aggressions or degradation processes such as oxidation.

Moreover, encapsulation is also a means to provide release of an active ingredient, which is spread out over a more or less extended period of time, instead of being instantaneous. In other words, encapsulation systems allow to slow the release of active ingredients, and therefore they may be suitable for an utilisation in applications wherein a controlled release is required, which is the case in many applications in the field of perfumery. In fact, since, as mentioned above, the most volatile fragrances, or "top notes" are responsible for the first impact in the consumer feeling, it is most of the time desirable that both less and more volatile fragrances are slowly released.

Finally, an encapsulated system can also constitute a means to improve the substantivity of molecules on a substrate, by providing a system capable of chemical or physical bonding with a particular surface or substrate.

Micro-encapsulation and inclusion complexes with specific materials such as cyclodextrins have been used in the prior art to decrease volatility, improve stability and provide slow-release properties of perfuming ingredients. However, when contacted with an aqueous medium, cyclodextrin based systems release the fragrance immediately, which limits their use as controlled release systems, in particular in applications involving an aqueous medium, such as in detergents.

Many other encapsulation techniques have been disclosed in the prior art and include for instance spray-drying, coacervation or yet extrusion. These techniques, while providing systems that stabilise and provide a certain controlled release of an active ingredient such as a perfume, do not however constitute systems capable of improving the sustained release of perfuming ingredients from substrates. Now, in particular in the field of functional perfumery, for applications such as detergents or fabric softeners, the substantivity of a perfume on a substrate such as a fabric constitutes an issue of paramount importance for the industry.

The absorption of perfume onto polymeric carrier materials, capable of improving the substantivity of perfume on surfaces, is also the subject of some disclosures from the prior art, in particular in the patent literature. More particularly the use of combined polymeric carriers has been described within the framework of perfume encapsulation, with the aim of improving the deposition of perfume on a substrate, in an application. As an example, U.S. Pat. No. 6,194,375 discloses organic polymer particles comprising perfume absorbed therein, and wherein a further polymer incorporating free hydroxyl groups is attached at the exterior of the particles. In a detergent application, the latter polymer serves to promote deposition of the particles from a wash or a rinse liquor during a washing cycle. Similarly, U.S. Pat. No. 6,329,057 describes polymeric particles comprising a hydrophobic organic matrix and, located at the exterior, free cationic groups and a further polymer which comprises free hydroxy groups. However, while providing an improvement of the deposition of perfume in application, by means of the use of a second polymer grafted at the surface of the particles, the latter systems do not allow simultaneously a controlled release of the perfume within a prolonged period of time.

EP 1146057 discloses polymeric nano-particles including olfactory molecules, which are described as producing the desired sustained and controlled release action in application. The described nano-particles are prepared by a semi-continuous batch polymerisation process consisting in continuously adding a liquid monomer component and a perfume to an aqueous solution of a first initiator comprising an emulsifier. Subsequently, a second and a third initiator are added to the reaction mixture. This process presents the drawback of mixing monomers with perfuming ingredients, possibly inducing contamination of the perfume with un-reacted monomers. Moreover, the perfume may react with free radicals during polymerisation and thus be subjected to degradation.

It can be concluded from the existing prior art that the industry still requires improvements in the field of polymeric encapsulation, and that, in particular, a delivery system providing at the same time a controlled release of an active ingredient there-encapsulated and an efficient deposition of said active ingredient on a substrate so as to obtain a sustained release from such a surface, is still needed. The present invention offers an efficient solution to the problems encountered in the prior art, by providing novel micro- or nano-particles, based on the use of a single polymer which has been chemically modified at its surface so as to be able to efficiently absorb a perfume. The particles or capsules of the invention protect the perfume during its use and storage, protect it from interactions with other constituents from a base when used to perfume a functional consumer product, and extend the release of the encapsulated perfume from a substrate. Moreover, the particles of the invention are prepared by a process which avoids any problem of contamination or degradation of the perfume unlike what was the case in the prior art.

SUMMARY OF THE INVENTION

Therefore, the present invention first relates to novel, solid, micro- or nano-particles susceptible of being obtained by a process comprising the steps of a) dispersing under stirring at least one hydrophobic monomer in a medium wherein the corresponding polymer is not soluble, comprising an initiator, a cross-linking agent and at least one stabiliser, thus providing a suspension, dispersion or mini-emulsion; b) heating the suspension, dispersion or mini-emulsion at a temperature typically comprised between 50 and 90° C., thus inducing polymerisation and providing spherical polymeric hydrophobic particles; c) optionally using an excess of an organic solvent to remove the un-reacted monomers; and d) adding a chemical agent, capable of chemically modifying the polymeric particles so as to transform hydrophobic moieties of the polymer into hydrophilic moieties at the surface of the particles and optionally in a part of the core of the particles.

The particles of the invention are in other words formed of a spherical single cross-linked hydrophobic polymer, which has been chemically modified by means of a chemical agent so as to comprise hydrophilic moieties at its surface and optionally in a part of its core.

DETAILED DESCRIPTION OF THE PREFERRED EMBODIMENTS

Figure 1:
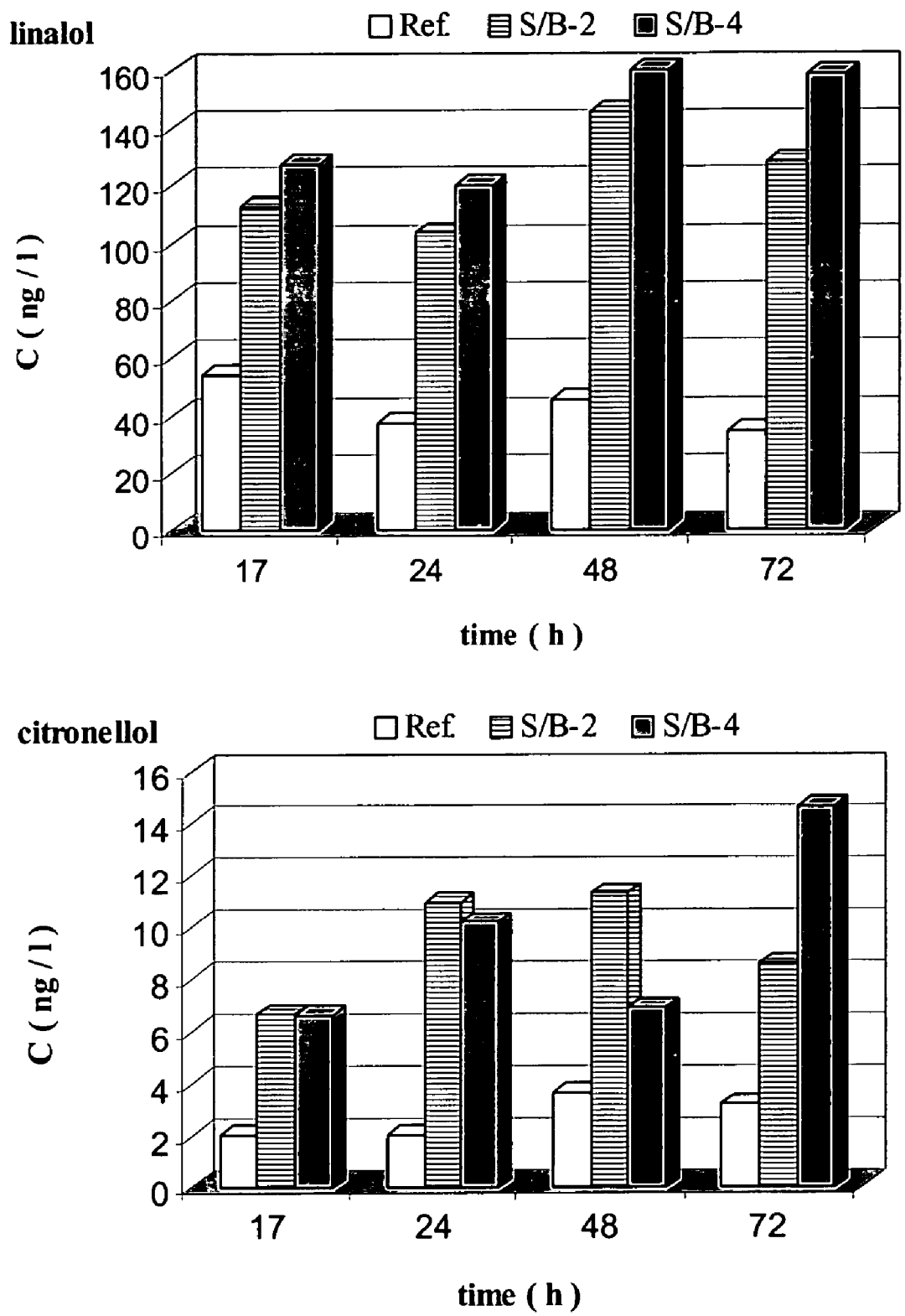
FIG. 1 is a bar diagram representing the release kinetics of linalol and citronellol from various samples, namely:
Ref.: softener base containing 1% of model-perfume;
S/B-2: softener base containing B-2-type nano-capsules filled with model-perfume and coated with poly(methyl methacrylate-co-trimethyl ammonium ethyl methacrylate); and
S/B-4: softener base containing B-4-type nano-capsules filled with model-perfume and coated with the same copolymer as B-2-type nano-capsules.
All the samples contain the same amount of perfume.

A perfuming ingredient or composition may advantageously be absorbed spontaneously within the micro- or nano-particles of the invention formed, thus providing a perfume delivery system which constitutes another object of the invention. Such a delivery system may be used in any kind of perfuming applications, in fine perfumery as well as in a functional perfumed article, and is particularly advantageous when used in applications such as shampoos, detergents or fabric softeners, wherein the delivery system provides a slow release of a perfume and more particularly a sustained release of volatile top notes from a substrate in application, during a washing or rinsing cycle. In this kind of application, the system of the invention allows the perfume to be deposited on different substrates and to be perceived over an extended period of time once transferred onto these substrates.

A solid micro- or nano-particle formed of a spherical single cross-linked hydrophobic polymer chemically modified so as to comprise hydrophilic moieties at its surface and optionally in its core, is thus a first object of this invention. As mentioned above, the prior art known up to date discloses systems wherein a first polymer is combined with a second polymer that provides a certain functionality at the surface of the particles formed from the first polymer. The present invention provides a first advantage over this prior art, as the system is based on the use of a single spherical polymer which is modified at least in surface. This modification advantageously renders the particles capable of absorbing active ingredients, therefore offering a means of protecting high amounts of these ingredients, typically perfuming ingredients or compositions. When particles are fully modified i.e. in surface and in the totality of the polymer core, the encapsulation of hydrophilic drugs can be considered.

Thus, the capsules of the invention, when filled in with a perfuming ingredient or composition, constitute an efficient delivery system for the ingredient or composition. The preparation of such a delivery system involves contacting already prepared and purified micro- or nano-particles, as defined above, with a perfuming ingredient or composition. In such a process, the purification of the particles (step c), preceding the absorption of perfume within the latter, allows to obtain a system which does not present the risk of containing un-reacted monomers and thus avoids a possible contamination of the perfume, unlike what was the case in the prior art. On the other hand, such a delivery system thanks to the presence of hydrophilic moieties at the surface of the spherical capsules, can further comprise a coating at the surface of the particles, made of a copolymer capable of improving or modulating the affinity of the capsules with a particular substrate.

More objects, aspects and advantages of the invention will become apparent from the detailed description hereinafter.

The solid micro- or nano-particles of the invention are formed of a single spherical cross-linked hydrophobic polymer and are characterised by the fact that said hydrophobic polymer is chemically modified at least in surface and possibly in volume (i.e. in a part or in the totality of its core) so as to comprise thereon, hydrophilic moieties resulting from the chemical modification of hydrophobic moieties of the polymer. The hydrophobic polymers suitable for the purpose of the invention may be formed by copolymerisation of vinyl monomers, with some cross-linking and/or chain branching agent included in the monomers which are polymerised, so that some cross-linking occurs between the polymer chains. One suitable category of monomers for the purpose of the invention is an ester of formula

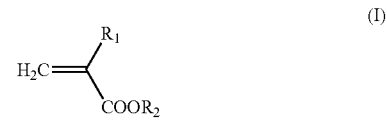

(I)

wherein $R_1$ is a hydrogen or an alkyl group having from 1 to 6 carbon atoms, preferably from 1 to 3 carbon atoms, and $R_2$ is a linear or branched, alkyl group having from 1 to 8 carbon atoms. Suitable examples of these monomers include, but are not limited to, tert-butyl acrylate, tert-butyl methacrylate, isobutyl methacrylate, n-butyl(meth)acrylate, isobutyl acrylate, n-propyl acrylate, isopropyl methacrylate and norbornyl(meth)acrylate. In a particular embodiment, this category of monomers is admixed in the first step of the process of the invention with a second acrylate monomer comprising tertiary amino groups.

Another monomer which is suitable for the purpose of the invention is a styrene derivative of formula

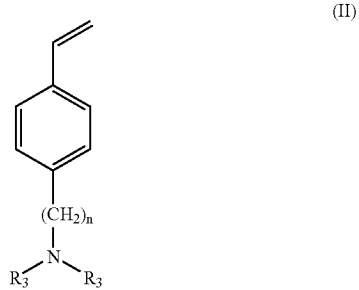

wherein n is an integer, varying from 0 to 3, and $R_3$ is a hydrogen, a methyl, ethyl, propyl or isopropyl group.

Cross-linking between polymer chains formed from the above monomers can be achieved by including in the monomer mixture a small proportion of a monomer with two carbon-carbon double bonds, often termed polyolefinic or multifunctional cross-linking polymer. Cross-linking agents of formula

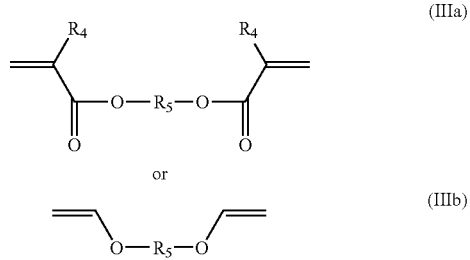

wherein $R_4$ is a hydrogen or a methyl group and $R_5$ is an aliphatic or acyclic group, linear or branched, comprising from 1 to 10 carbon atoms can be given by way of example. Other examples of cross linking agents suitable for the purpose of the invention include in particular divinyl benzene, 3,9-divinyl-2,4,8,10-tetraoxaspiro[5.5]undecane, 1,3-divinyltetramethyldisiloxane, 1,4-butanediol divinyl ether, 1,3-divinyltetramethyldisiloxane, diethoxydivinylsilane, divinyldimethylsilane, ethylene glycol divinyl ether, diethylene glycol divinyl ether, adipic acid divinyl ester, triethylene glycol divinyl ether, 1,4-cyclohexanedimethanol divinyl ether, divinyl sebacate, divinyltetramethyldisilane, 1,5-divinylhexamethyltrisiloxane, 1,6-hexanediol divinyl ether or tetra(ethylene glycol) divinyl ether.

The cross-linkage rate of the capsules of the invention is determined by the relative proportions of monomer and cross-linking agent. Typically this rate is comprised between 2 and 30%.

The micro- or nano-particles of the invention are characterised by the fact that they are formed of a spherical single polymer which has been functionalised so as to comprise hydrophilic moieties in surface and optionally in the core of the polymer. The hydrophilic moieties present at the surface of the particles of the invention result from a chemical modification of the hydrophobic moieties of the polymer, by means of a chemical agent capable of transforming the latter hydrophobic moieties into hydrophilic moieties. The chemical modification of the particles' surface and optionally core, advantageously renders them capable of absorbing spontaneously, and in high amounts, any fragrance material or composition. In a particular embodiment of the invention the hydrophilic moieties present at the surface of the particles consist of carboxylic moieties. In another embodiment, the hydrophilic groups consist of quaternary ammonium moieties. However, these examples should not be considered as limiting the invention. In fact, other hydrophilic groups may be considered, such as hydroxy, sulfonate or yet thiol moieties. A person skilled in the art is able to chose the starting monomer accordingly.

A process for the preparation of solid micro- or nano-particles as defined above, is also an object of the present invention. Such a process comprises the steps of: a) dispersing under stirring at least one hydrophobic monomer in a medium wherein the corresponding polymer is not soluble, comprising an initiator, a cross-linking agent and at least one stabiliser, thus providing a suspension, dispersion or miniemulsion; b) heating the suspension, dispersion or miniemulsion at a temperature typically comprised between 50 and 90° C., thus inducing polymerisation and providing polymeric hydrophobic particles; c) optionally using an excess of an organic solvent to remove un-reacted monomers; and d) adding a chemical agent, capable of chemically modifying the polymeric particles so as to transform hydrophobic moieties into hydrophilic moieties at the surface of the particles and optionally in a part of the core of the particles.

In a first step, a suspension, dispersion or miniemulsion is formed, depending on the final desired size of the polymeric particles. More particularly, a miniemulsion allows to prepare nano-particles, i.e. particles with a mean size varying from about 50 to about 500 nm; while a dispersion and a suspension of monomers allow to prepare micro-particles having a particle size varying between 1 and 5 μm and above 5 μm respectively.

The preparation of nano-capsules not yet functionalised (i.e. steps a) to c) of the process) can be carried out by different methods well known in the art, among which miniemulsion polymerisation, which is described by K. Landfester et al. in Miniemulsion Polymerization with Cationic and Nonionic Surfactants, Macromolecules, 1999, 32, 2679-2683. More particularly, the process starts with the formation of a miniemulsion, i.e. a dispersion of stabilised droplets having a size varying between 50 and 500 nm. This dispersion is carried out by strong stirring of a system containing a monomer, a liposoluble initiator, a cross-linking agent, water, and a stabilising system consisting of a surfactant, and a co-surfactant, also referred to as "hydrophobe". For instance, nano-capsules can be obtained by using anionic, cationic and nonionic surfactants. Sodium dodecyl sulfate (SDS) and cetyltrimethylammonium bromide (CTAB) are examples of suitable surfactants. A co-surfactant suitable for the purpose of the invention consists of hexadecane. Suitable monomers and cross-linking agents have been described above.

On the other hand, the preparation of micro-particles according to the invention starts with the formation of a suspension or dispersion of a monomer into an aqueous medium typically comprising a cross-linking agent, an initiator, such as benzoyl peroxide and a stabiliser such as polyvinyl alcohol. Suspension polymerisation is also well described and known by a person skilled in the art.

The polymerisation step is carried out by heating the miniemulsion, suspension or dispersion to a temperature comprised between about 50 and 90° C. and provides hydrophobic spheres, the size of which is determined by the first step chosen, as mentioned above.

An optional purification step follows, in order to remove un-reacted monomers. The purification step is carried out by the addition of an organic solvent in excess, such as dichloromethane, followed by a lyophilisation with dioxan for instance.

The last step of the process is essential and characterises the products of the invention. It consists of a chemical modification of the surface of the hydrophobic polymer and possibly of a part of its core, so as to transform hydrophobic moieties of the polymeric particles, into hydrophilic moieties. This surface and optionally core modification is carried out by means of a "chemical agent" capable of chemically transforming hydrophobic moieties into hydrophilic moieties. When the starting monomer is an ester, a "chemical agent" can consist of an acid, capable of cleaving ester functions of the hydrophobic polymer through a chemical hydrolysis, thus transforming ester moieties into carboxylic moieties. In another embodiment, wherein a starting monomer consists of a styrene derivative, the chemical agent, may be an agent capable of quaternise the amino-function, such as a methyl iodide, which transforms the tertiary amino moieties into quaternary ammonium hydrophilic moieties. A more detailed description of the functionalisation step will be given in the examples below. The capsules thus obtained possess a hydrophobic core (or a partially hydrophobic core) and a hydrophilic surface.

The hydrophilic surface of the micro- or nano-particles obtained by the process of the invention renders them advantageously capable of absorbing an active ingredient, such as a perfuming ingredient or composition, thus allowing the preparation of a perfume delivery system. The hydrophilic surface of the particles of the invention also renders easy a further coating of the particles by a hydrophilic copolymer.

A perfume delivery system comprising solid capsules as defined above, which are filled in with a perfuming ingredient or composition, is also an object of the invention. The delivery system of the invention provides a slow-release of the most volatile molecules there-absorbed, and is therefore particularly useful in applications intended for functional perfumery.

The terms "perfuming ingredient or composition" as used herein are deemed to define a variety of fragrance materials of both natural and synthetic origins. They include single compounds and mixtures. The delivery system of the invention may encapsulate volatile or labile components which may be in liquid or solid form. Specific examples of such compounds include perfuming ingredients belonging to varied chemical groups such as alcohols, aldehydes, ketones, esters, acetates, nitriles, terpenic hydrocarbons, heterocyclic nitrogen- or sulfur-containing compounds, as well as natural or synthetic oils. Many of these ingredients are listed in reference texts such as Perfume and Flavour Chemicals by S. Arctander, 1969, Montclair, N.J., USA, or more recent versions thereof, or in other similar books.

The proportions in which a perfuming ingredient or composition may be absorbed within a micro-particle of the invention can be as high as 80% by weight relative to the total weight of the particle, and is not affected by the variation of the polarity of the fragrance as demonstrated in the example below. This very high proportion of perfume which may be contained within the micro-particles of the invention is totally unexpected and provides an advantage of paramount importance for the thus obtained delivery system, compared with the systems known up to date.

In a particular embodiment of the invention, the delivery system as defined above further comprises a thin layer of adsorbed copolymer at the surface of the particles. The copolymer allows to improve the stability of the latter, in particular in aqueous suspensions. Furthermore, the presence of a copolymer on the particles may render the latter compatible with materials such as surfactants or other constituents of a functional product formulation or base, and allows to control the release of fragrances in such applications. Finally, this optional coating also constitutes a mean to improve and control the deposition of capsules onto a substrate, which is very useful for an application in some functional products such as shampoos or fabric softeners. The nature of the copolymer suitable for the purpose of the invention is therefore chosen according to the nature of the product that has to be perfumed with the delivery system and to the nature of the co-ingredients present in such a product. Examples of copolymers suitable for the coating of a delivery system of the invention intended for an utilisation in a fabric softener base, include but are not limited to, amphiphilic random or multiblock copolymers such as poly (ethyleneglycol)-block-poly(propyleneglycol)-block-poly (ethyleneglycol) or poly(tetramethyl ammonium ethyl methacrylate-co-methyl methacrylate) or yet poly(methacrylic acid-co-methyl methacrylate).

The adsorption of a copolymer at the surface of the particles of the invention is rendered easy and physically controllable thanks to the presence of the hydrophilic moieties at the surface of the capsules of the invention. More particularly, the adsorption of a copolymer at this surface is spontaneous and relies either on electrostatic interactions between a charged copolymer and charged hydrophilic moieties at the surface of the particles, or simply on hydrogen bonding. The variation of the pH may thus be a way to control the adsorption of a copolymer, for instance by inducing the ionisation of hydrophilic carboxylic moieties of the particles, thus allowing a spontaneous adsorption of a copolymer bearing an opposite charge. In a general manner, the adsorption is simply carried out by the addition of the delivery system of the invention to an aqueous solution of a chosen copolymer followed by a separation step.

The delivery system of the invention is prepared by a process comprising the step of contacting the purified micro- or nano-particles obtained as above-described with a perfuming ingredient or composition which is instantaneously absorbed within the particles, thus providing the desired perfume delivery system. The purification step in the preparation of the capsules is essential to the process and advantageously allows to avoid that any un-reacted monomer contaminate the perfuming ingredients.

The coated or un-coated particles of the invention encapsulating a perfuming ingredient or composition, can be used in many applications in perfumery, both in fine and functional perfumery. In particular, they can be used, together with other perfuming ingredients, solvents or adjuvants of current use in the preparation of a perfume formulation, in applications such as in a perfume, an eau de toilette or an after-shave lotion, but also in functional products, i.e. together with functional constituents of bases present in products such as a soap, a bath or shower gel, a shampoo or another hair-care product, a cosmetic preparation, a deodorant or an air-freshener, a detergent or fabric softener or a household product. In particular, the coated particles can be used in both liquid and dry products, and provide, at the same time, an efficient protection for volatile molecules, a strong reduction of losses during storage, and finally a slow release over an extended period of time. In a particular embodiment, the delivery system of the invention is used to perfume a detergent or fabric softener comprising a surfactant, and is characterised by the fact that it comprises charged moieties at its surface, which are opposite to that of the main surfactant of the base.

Generally speaking, in all applications, the particles or capsules of the invention filled in with perfume may be used as such, or as being part of a perfume formulation comprising also other perfuming ingredients, solvents or adjuvants of current use in the preparation of a perfume formulation.

A perfume formulation comprising as an active ingredient, together with other perfuming ingredients, solvents or adjuvants of current use in the preparation of a perfume formulation, a delivery system according to the invention, is thus also an object of the present invention. The terms "perfume formulation", also sometimes simply referred to as "perfume", must be understood within the framework of the art of perfumery. In this field, these terms designate, in a general manner, a blend of odoriferous materials, perceived as having its own unique and aesthetically appropriate identity. More particularly, it is a carefully balanced blend based on a definite structure (specific ingredients and specific proportions of each of them) in which each material plays its part in achieving the overall fragrance. This creative and original composition is thus structurally characterised by a formulation constituted by the ingredients themselves and the relative proportions.

Within the framework of the invention, the solid delivery systems may be for instance dry blended with other dry form of perfuming co-ingredients (extruded, spray-dried or other encapsulated forms may be considered).

A perfume formulation in the field of perfumery is not just a mixture of pleasantly smelling materials. On the other hand, a chemical reaction involving reactants and products formed, which constitutes a dynamic system, cannot be assimilated, unless otherwise specified, to a perfume formulation, even when odoriferous materials are present among the starting products, the formed products, or even both of them.

Now, apart from having a well defined identity, a perfume or perfume formulation must meet a number of technical requirements. It must be for instance sufficiently strong, it must be diffusive, it must be persistent, and it must retain its essential fragrancing character throughout its period of evaporation.

Besides, a perfume formulation must be adapted as a function of the application for which it is intended. In particular, a perfume formulation may be designated for fine fragrance or designed for a functional product (soap, detergent, cosmetics, etc.) which needs to present a degree of persistence appropriate to the use for which they are intended. The formulations must also be chemically stable in the end product. The technique by which this is achieved is an essential part of the perfumer's art, and it is needed many years of dedicated work to arrive at the level of experience necessary to formulate perfumes or perfume formulations that are not only original but also well made.

Now, these technical considerations imply that a perfume formulation may comprise other ingredients than perfuming materials, which are hereby designated as "solvents or adjuvants of current use in the preparation of a perfume formulation".

First of all, independently of whether the composition is designed for fine perfumery or for use in a technical product, a solvent system is most of the time part of the fragrance. Solvents currently used in the preparation of a perfume formulation include, but are not limited to, dipropylene glycol, diethyl phtalate, isopropyl myristate, benzyl benzoate, 2-(2-ethoxyethoxy)-1-ethanol or ethyl citrate for the most commonly used.

On the other hand, the creation of a perfume formulation intended for a functional product involves considerations both of aesthetics (how should the product smell) and of the technique of adapting the perfume to the product formulation or, as is often said, to the product base. The perfume formulation may therefore comprise "adjuvants" which can have many different functions, depending on the base which has to be perfumed. These adjuvants include for instance stabilisers and antioxidants.

Today, the range of product types and product formulations that are perfumed has become so extensive and subjected to such frequent changes that an approach based on a product by product basis and on the definition for each case of the adjuvants that can be used, is impractical. That is why the present application does not comprise an exhaustive list or detailed approach of the solvents or adjuvants currently used in perfume formulations. However, a skilled person in the art, i.e. an expert perfumer, is capable of choosing these ingredients as a function of the product to be perfumed and of the nature of the perfuming ingredients in the perfume.

EXAMPLES

The invention will now be illustrated by way of examples wherein the temperatures are indicated in degrees Celsius and the abbreviations have the usual meaning in the art.

Example 1

Preparation of Bulk Nano-Particles Chemically Modified at their Surface so as to Comprise Carboxylic Moieties Procedure (Steps a to c)

In a flask containing a surfactant, namely sodium dodecyl sulfate (SDS) dissolved in water, there was poured a solution containing a hydrophobic monomer such as tertbutyl acrylate (tBuA), optionally admixed with another monomer such as methyl methacrylate (MMA) or hydroxy ethyl methacrylate (HEMA); a cross-linker such as ethylene glycol dimethacrylate (EGDMA); a co-surfactant or hydrophobe, such as hexadecane; and a liposoluble initiator, such as α,α'-azoisobutyronitrile (AIBN).

A particular mixture with the following composition was prepared accordingly:

| Ingredient | Weight [g] |
| --- | --- |
| tBuA/EGDMA | 6.000 |
| Hexadecane | 0.125 |
| SDS | 0.072 |
| AIBN | 0.150 |
| Water | 24.000 |

The mixture was stirred during one hour and then passed to ultrasound during 60 s. The emulsion was completed with water according to the composition reported above. For a large amount of monomer, a microfluidizer has been used to produce mini-emulsion with a mean size in the range of 100 to 400 nm. The polymerisation was then carried out by heating to 65° C. and mechanically stirring over a night.

The polymeric particles have been then precipitated in an excess of methanol, filtrated on a fritted glass, and washed several times with methanol. The obtained white product was then dispersed in dioxan in order to lyophilize.

Five samples of particles were prepared with various cross-linkage rates, by varying the relative proportions of monomer and cross-linking agent as reported in Table 1 below. Starting from 6 g of monomer/cross-linking agent, 4 g of pure nano-capsules were obtained.

The size distribution was verified by Dynamic Light Scattering measurements. The average size of the droplets in the mini-emulsion, characteristic of the final capsule suspensions was comprised between 200 and 260 nm.

Functionalisation of the Capsules (Step d)

In a typical experimental procedure 5 g of capsules and 1 g of cetyltrimethylammonium bromide (CTAB) were dispersed in 25 ml of concentrated HCl. Depending on the type of polymeric particles, the mixture was allowed to stir during a period of time varying from 30 min to 24 hours at room temperature. Aqueous solution of sodium hydroxide NaOH was then added dropwise till a neutral pH was obtained. In order to extract the functionalized capsules, 50 ml of dichloromethane were added to the suspension and the obtained intermediate phase was concentrated and freeze dried.

There were obtained 3.5 g of particles functionalised at their surface so as to comprise carboxylic moieties thereon.

Characterisation of the Functionalised Particles

Infrared spectroscopy revealed the presence of a band around 3300 $cm^{-1}$, characteristic of the acidic function and confirming the cleavage of the ester function in an acidic function. The nano-capsules have been also dispersed in water and analysed by Zeta Potential measurements. This showed a decrease of the Zeta potential when the value of the pH was varied from 4 to 9 implying that the surface of the particles comprised carboxylic groups.

Swelling of the Nano-Capsules with a Perfume

A model-perfume used for the swelling of the capsules was prepared by admixing the following raw materials:

| Ingredients | Parts by weight |
| --- | --- |
| Linalol | 15 |
| Citronellol | 10 |
| Carbinol acetate | 10 |
| Dihydromyrcenol[1] | 28 |
| Verdox ®[2] | 25 |
| Verdyl acetate[3] | 12 |
| Total | 100 |

[1] origin: International Flavors and Fragrances, USA
[2] 2-tert-butyl-1-cyclohexyl acetate; origin: International Flavors and Fragrances, USA
[3] origin: Givaudan-Roure SA, Vernier, Switzerland The five capsule samples were each mixed with an excess of the model-perfume and let to swell at room temperature for one to several days. The excess of the perfume was then removed and the fraction of the perfume in the final swelled capsules referred to as B-1, B-2, B-3, B-4 and B-5 respectively was calculated by measuring the weight of the capsules before and after swelling process. The results are reported in Table 1.

TABLE 1

Characteristics of bulk nano-capsules

| Nano-capsule sample | Monomers | Monomer fraction (% w) | Cross-linkage rate [% EGDMA] | Perfume fraction (% w) |
| --- | --- | --- | --- | --- |
| B-1 | tBuA | 98 | 1.30 | non measured |
| B-2 | tBuA | 96 | 2.62 | 76.6 |
| B-3 | tBuA | 94 | 3.98 | non measured |
| B-4 | tBuA | 92 | 5.32 | 88.3 |
| B-5 | MMA/tBuA | 41/52.5 | 4.00 | 63.0 |

Coating of the Particles

The nano-capsules containing the model-perfume were then added to aqueous solutions of amphiphilic polymers such as poly (ethylene glycol-block-propylene glycol-block-ethylene glycol), PEG-PPG-PEG, or poly(diallyl dimethyl ammonium chloride) (PDADMAC).

The coated particles were then extracted and dispersed as such in the bases intended for specific applications (see Examples 5 and 6).

Example 2

Preparation of Hollow Nano-Capsules Chemically Modified at their Surface so as to Comprise Carboxylic Moieties Procedure (Steps a to c)

In a flask containing a surfactant, namely sodium dodecyl sulfate (SDS) dissolved in water, there was added a solution containing a monomer (tBuA) optionally in admixture with another monomer (MMA); 1,6 hexandiol dimethacrylate (HDDMA) or ethylene glycol dimethacrylate (EGDMA) as cross linking agent; a large amount (25% weight of the total oil phase) of a hydrophobe namely hexadecane; and an initiator, namely α,α'-azoisobutyronitrile (AIBN).

A particular mixture had the following composition:

| Ingredient | Weight [g] |
| --- | --- |
| tBuA/HDDMA | 7.030 |
| Hexadecane | 1.760 |
| SDS | 0.500 |
| AIBN | 0.132 |
| Water | 60.000 |

The mixture was stirred during 1 hour and then passed to microfluidizer. After controlling the size distribution by Dynamic Light Scattering, the emulsion was heated to 65° and mechanically stirred over a night. At the end of the polymerization reaction, the size distribution was measured again and compared to the one obtained before the reaction. The polymeric particles were then precipitated in an excess of methanol, filtrated on a fritted glass, and washed several times with methanol. Finally the obtained product was dried under vacuum at 50°. The obtained nano-capsules were then dispersed in pentane, kept under stirring for several hours, filtered and dried under vacuum at 50°.

Five samples of nano-capsules were prepared with different types of monomers and different cross-linkage rates, by varying the relative proportions of monomer(s) and cross-linking agent as shown in Table 2.

Functionalisation of the Capsules (Step d)

The same procedure as reported in Example 1 was used to functionalize the present capsules.

Characterisation of the Obtained Capsules

The cleavage of the ester groups was controlled by Infra-red Spectroscopy. The size distribution and the Zeta potential were measured for the capsule samples as reported in Example 1.

Swelling of the Nano-Capsules with Perfume

The procedure of swelling experiments is the same as reported in Example 1. The results are shown in Table 2 wherein the final swelled capsules are referred to as H-1, H-2, H-3, H-4 and H-5 respectively.

TABLE 2

Characteristics of hollow nano-capsules

| Nanocapsule sample | Monomers | Monomer fraction (% molar) | Cross-linkage rate [% molar] | Perfume fraction (% w) |
|---|---|---|---|---|
| H-1 | tBuA | 94 | 6 | 84.4 |
| H-2 | tBuA | 92 | 8 | 78.4 |
| H-3 | MMA/tBuA | 18.8/75.2 | 6 | 81 |
| H-4 | MMA/tBuA | 18.4/73.6 | 8 | 76.4 |
| H-5 | HEMA/tBuA | 18.8/75.2 | 6 | 52.6 |

Coating of the Particles

After having swelled the capsules with the perfume, they were added to aqueous solutions of respectively guar hydroxypropyltrimonium chloride and poly(methyl methacrylate-trimethyl ammonium ethyl methacrylates). The adsorption of the polymers onto the nano-capsules containing the perfume was controlled by Zeta potential measurements. The concentration of the used polymers for the coating was also optimized in term the corresponding release kinetics.

Example 3

Preparation of Hollow Nano-Particles Chemically Modified at their Surface so as to Comprise Cationic Moieties Procedure (Steps a to c)

In the present procedure, at least one of the used monomers contained tertiary amine groups like dimethyl amino ethyl methacrylate (DMAEMA). For a typical experiment the reaction mixture had the following composition:

| Ingredient | Weight [g] |
|---|---|
| DMAEMA | 3.243 |
| tBuA | 2.944 |
| EGDMA | 0.792 |
| Hexadecane | 1.837 |
| SDS | 0.600 |
| AIBN | 0.158 |

After dissolution of SDS in water, a mixture of EGDMA, tBuA, hexadecane, DMAEMA and AIBN was added and the all mixture was stirred for 1 hour. The obtained emulsion was then treated with ultrasounds for 2 min at room temperature. The size distribution was measured and the reaction mixture was heated to 72° and maintained at this temperature over night. The mixture was then cooled down to room temperature and dispersed in 50 ml of heptane and filtered. The obtained composition was then dried under vacuum at 50°. With this composition, pure nano-particles bearing tertiary amine groups have been produced at a cross-linking degree of 8%.

Functionalisation of Capsules (Step d)

In a two-necked round bottom flask, 1.9 g of pure nano-particles were dispersed in 20 ml of dry tetrahydrofuran THF (distilled on $CaH_2$). The media was cooled down by an ice bath to 0°. To this solution, 795 mg of $Me_2SO_4$ were added dropwise by a syringe (n=6.3 mmol, M=126.13 g.mol$^{-1}$). The solution was stirred for 20 minutes at 0°, then for 3 hours at room temperature. The reaction mixture was filtered and washed with diethyl ether and then the solid phase was dried under vacuum at 50°.

Characterisation of the Functionalised Particles

The size distribution of the functionalised nano-capsules, dispersed in water, was determined by Dynamic Light Scattering measurements. The presence of the cationic groups at the surface of the nano-capsules was controlled by Zeta potential measurements.

Swelling of the Nano-Capsules with Fragrances

The procedure of swelling experiments was the same as that reported in Example 1. By using the same model-perfume, a fraction of encapsulated perfume of 48.4% was measured.

Example 4

Preparation of Micro-Particles Chemically Modified so as to Comprise Carboxylic Moieties Procedure (Steps a to c)

Apparatus: A 10 liters jacketed glass reactor (Schmizo) with stirrer (steel), dropping funnel, condenser and argon inlet.

Water (5 liters of de-ionised quality) was introduced in the reactor followed by the addition of polyvinyl alcohol (100 g) and the mixture was heated with stirring to 70° (stirring speed: 480 rpm). After dissolution, a degassed solution of tert butyl acrylate (tBuA) (155 g), ethylene glycol dimethyl acrylate (4.9 g) and benzoyl peroxide (initiator) was added dropwise over a period of 70 min. The reaction mixture was maintained under stirring for 20 hours at 70°. The reaction mixture was then cooled to room temperature and filtered. The solid was washed four times with de-ionised water and afterwards, un-reacted monomers and other side products were removed by extraction with tetrahydrofuran in a Soxhlet® extractor (in two operations, 3 hours each).

Finally, the micro-capsules were dried under vacuum (20 Pa) at 50° and then sieved (45 mesh) to obtain 136 g of a white powder. The mean diameter of these micro-particles was determined by Optical Microscopy and found to be around 60 µm.

Functionalisation of the Micro-Capsules (Step d)

a) In Surface

Surface functionalisation was achieved by strong acid tert-butyl ester hydrolysis. A 100 ml round bottom flask was loaded with 2.00 g of micro-spheres, 0.10 g of hexadecyltrimethylammonium bromide (HDTMAB) and 20 ml of concentrated HCl solution. The flask was fitted with a refrigerator and the reaction was run overnight under stirring. The functionalised micro-spheres were then collected by filtration and rinsed over the filter with de-ionised water and finally dried overnight at 50° under vacuum.

b) In Volume (Core Functionalisation)

Two different functionalisations of the micro-capsules obtained by the procedure described above were performed using an equivolumic solution of trifluoacetic acid and dichloromethane. A 100 ml round bottom flask was loaded with approximately 40 ml of an equivolumic solution of trifluoroacetic acid (TFAA) and dichloromethane. Approximately 2 g of micro-spheres were dispersed in the solution and a refrigerator was fitted on the flask. The dispersion was heated to reflux and the ester cleavage reaction was run for 2 hours for short depth functionalisation and 20 hours for entire core functionalisation. The micro-spheres were then dried by evaporation of both TFAA and dichloromethane using a rotary evaporator. Dichloromethane was re-introduced in the flask and re-evaporated. This last step was repeated until no TFAA could be detected in the product. The micro-spheres were then dried over night in a vacuum at 50°.

Swelling of the Micro-Capsules with Perfume

The capsules were allowed to swallow with an excess of the model-perfume (see Example 1) during 1 to 3 days. The swelled micro-particles were then separated from the remaining perfume by filtration and washed with ethanol. This experiment was repeated for various raw materials having various chemical functionalities or various polarities (i.e. LogP, P being the partition coefficient between octanol and water). Table 3 shows the obtained mass fraction in the final swollen micro-capsules for the following raw materials: benzyl acetate, geraniol, hexyl salicylate and Habanolide®.

TABLE 3

Fragrance mass fraction in micro-capsules and logP of the encapsulated perfume

| Fragrance molecule | LogP | Fragrance mass fraction in the final swollen micro-capsule weight [%] |
|---|---|---|
| Benzyl acetate | 1.57 | 49.8 |
| Geraniol | 3.59 | 36.2 |
| Hexyl salicylate | 4.91 | 50.7 |
| Habanolide ®[1)] | 5.37 | 50.3 |

[1)]pentadecenolide; origin: Firmenich SA, Geneva, Switzerland

The values reported in Table 3 outline that the difference in polarity between the different perfuming ingredients (represented by the variation of their logP) did not affect the fraction of perfume encapsulated in the capsules.

Example 5

Measures of the Performance of Delivery Systems According to the Invention in a Fabric Softener Application Samples Preparation Nano-capsules prepared as described in Example 1 were used. After swelling with the model-perfume, the capsules were dispersed in an aqueous copolymer solution of fully quaternized poly(methyl methacrylate-co-dimethyl amino ethyl methacrylate) at 0.05%. The monomeric composition of the copolymer was one to one. The copolymer concentration was optimized in terms of fragrance release kinetics. The obtained suspension was then mixed directly to a softener base of the following composition:

Standard Softener Base:

A softener base of the following composition was used:

| Ingredients | % function |
|---|---|
| Stepantex ® VS 90 | 16.5 |
| Calcium chloride Sol. 10% | 0.2 |
| Model perfume[1)] | 1.0 |
| Water | 82.3 |

[1)]see Example 1

Three various samples were prepared:

A reference sample consisting of 1% model-perfume added to the softener base and referred to as "Ref.";

Nano-capsules B-2 (see Table 1, Example 1) added to the softener base and referred to as S/B-2;

Nano-capsules B-4 (see Table 1, Example 1) added to the softener base and referred to as S/B-4.

TABLE 4

Compositions of the various softener samples

| Sample | Perfume or Capsules (mg) | Copolymer solution (ml) | Softener (ml) | Water (ml) | % perfume |
|---|---|---|---|---|---|
| Ref. | 20 | — | 1 | 1 | 1 |
| S/B-2 | 26 | 1 | 1 | — | 1 |
| S/B-4 | 22.6 | 1 | 1 | — | 1 |

Linitest: Washing Machine Simulation

For the washing machine conditions, the composition of 35 ml of softener, 2 kg of cotton and 15 l of water was considered. In order to keep the same conditions for our samples and for a cotton towel (16*22 $cm^2$) of about 47 g, 0.82 g of each sample and 352.35 ml of water were used. Cotton towels were rinsed one by one with the diluted samples in a linitest container for 7 min. The cotton towels were then centrifugated for 10 s and let to dry at room temperature.

Dynamic Headspace Analysis:

In order to follow the perfume release at a given period of time, a piece of cotton towel of 7*16 $cm^2$ was placed in a cylindrical glass container (Volume=80 ml). Under a constant air flow (160 ml/min) the volatiles have been collected by adsorption on Tenax® TA cartridges. The cartridges were then desorbed thermally in a Perkin Elmer Turbomatrix ATD desorber and analyzed with Agilent GC.

FIG. 1 shows the release kinetics of linalol and citronellol for the various samples, namely Ref., B-2 and B-4. All the measurements have been done on the dry cotton towels (kept in air at room conditions). The results showed a significant difference between the various samples in terms of performance. The capsules B-2 and B-4 improved the slow release of the perfume. This effect seemed to be more important for encapsulated linalol and citronellol for which, after three days, the release was about 3 to 5 times higher compared to perfumed softener without capsules.

Example 6

Measures of the Performance of Delivery Systems According to the Invention in a Shampoo Application Shampoo Base A shampoo base of the following composition was used:

| Ingredients | % function |
| --- | --- |
| Water de-ionised | 46.80 |
| Tylose H10 | 0.20 |
| Jaguar Exel | 0.20 |
| Dimethicone/laureth-23/salicylic acid | 1.00 |
| Dehyton AB-30 | 4.00 |
| Texapon NSO IS | 40.00 |
| Amphotensid GB 2009 | 3.00 |
| Arylpon F | 0.50 |
| Cithrol EGDS 3432 | 0.50 |
| Rewomid IPP 240 | 1.00 |
| Cethyl alcohol | 1.00 |
| Lanette E | 0.40 |
| Glydant | 0.15 |
| Phenonep | 0.05 |
| Citric acid 20% aqu. Sol. | 0.70 |
| Opacifier 631 | 0.50 |

Sample Preparation

Shampoo+Perfume ("Ref.")

To 50 mg of perfume, 2 ml of water and 8 ml of shampoo were added. The mixture was homogenized by magnetic stirring.

Shampoo+Capsules+Polymer ("Sh./B-2")

Nano-capsules swelled with the perfume (the equivalent of 50 mg of perfume) were dispersed in 2 ml of the fully quaternized poly(methyl methacrylate-co-dimethyl amino ethyl methacrylate) solution. The monomeric composition of the copolymer was one to two. The mixture was stirred for at least 24 hours. Then 8 ml of shampoo were added and let under magnetic stirring for at least 24 hours.

The composition of each sample is shown in Table 4.

TABLE 4

Composition of the various shampoo samples

| Sample | Perfume or Capsules (mg) | Copolymer solution (ml) | Shampoo (ml) | Water (ml) | % perfume |
| --- | --- | --- | --- | --- | --- |
| Ref. | 50 (perfume) | — | 8 | 2 | 0.5% |
| Sh./B-2 | 66.7 (B-2/pefume) | 2 | 8 | — | 0.5% |

Wash Protocol

Prepare 2 portions of shampoo, corresponding to (2*) 2.5 g for 8 g hair.

Fill each of 3 crystallisation dish <<cristallisoirs>> of 13 cm diameter. with 15° tap water.

Wear polyethylene gloves.

Rinse with running tap water at 35° for 60 s.

Drain excess water by passing twice the hair between two fingers

Lather hair with first portion for 60 s

Rinse with running tap water at 35° for 60 s.

Drain excess water as above

Lather hair with second portion for 60 s

Dip the hair band three times in the first 15° crystallisation dish

Drain excess water by passing once the hair between two fingers

Dip the hair band three times in the second 15° crystallisation dish

Drain excess water by passing once the hair between two fingers

Dip the hair band three times in the third 15° crystallisation dish

Drain excess water by passing once the hair between two fingers and put in the fruit spinner for 10 s.

Headspace Measurements

In order to follow the perfume release, at a given period of time, the hair band was placed in a cylindrical cell (V=80 ml). Under a constant air flow (160 ml/min), the volatiles have been collected by absorption on Tenax® cartridges. The cartridges were desorbed thermally in a Perkin Elmer Turbomatrix ATD Thermo Desorber and analyzed with Agilent GC. For each experience, the all procedure was repeated two times.

Results

Figure 2:
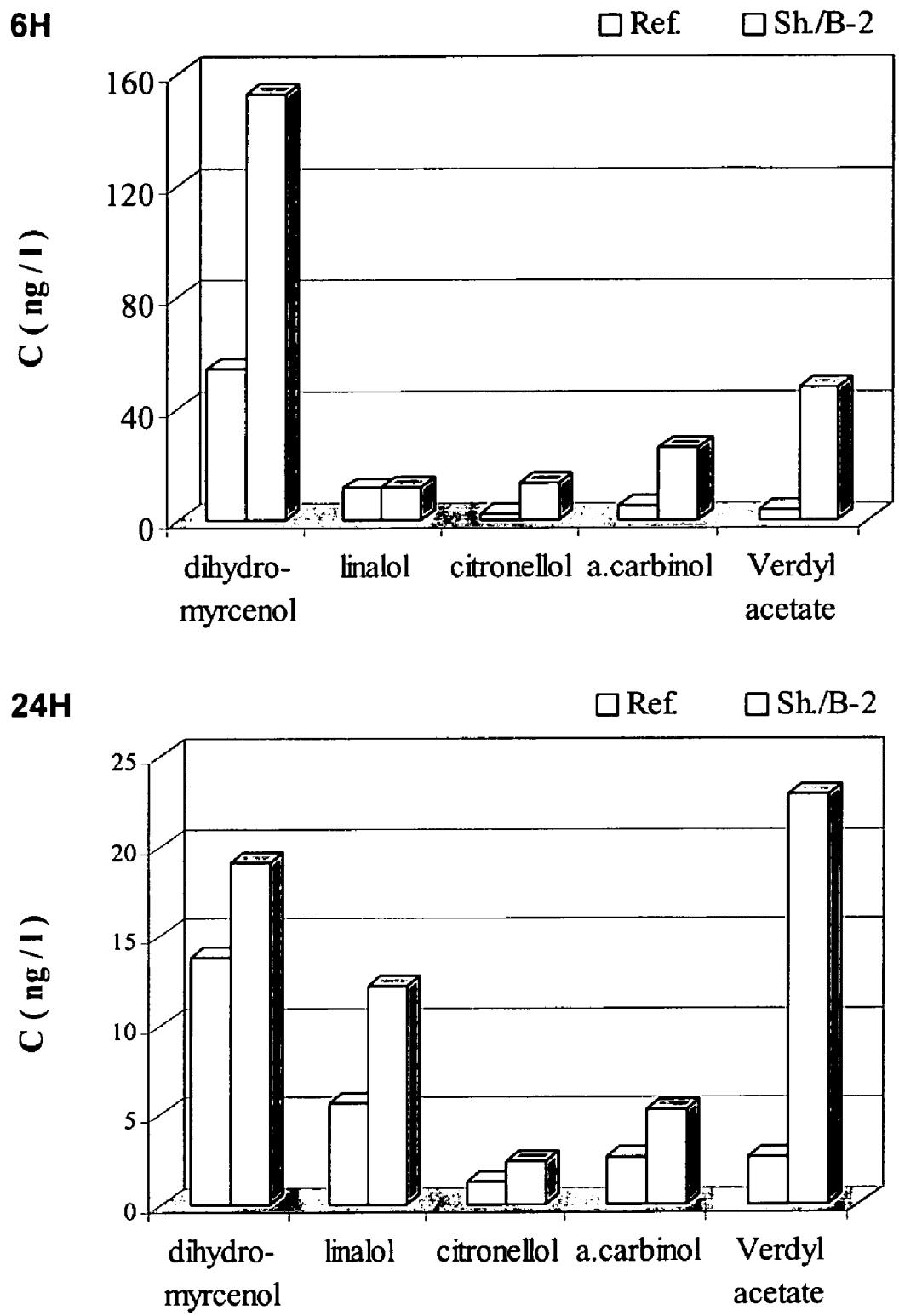
FIG. 2 shows the headspace analysis after respectively 6 and 24 h of various raw materials from two samples, namely:
Ref.: shampoo base containing 0.5% of model-perfume; and
Sh/B-2: shampoo base containing B-2-type nanocapsules filled with model-perfume and coated with poly(methyl methacrylate-co-trimethyl ammonium ethyl methacrylate).
The final concentration of perfume is the same for the two samples.

FIG. 2 shows the headspace analysis of each raw material for two samples: the reference (Ref.) and a sample having the same composition than this reference but where the perfume was encapsulated in capsules of the B-2-type. One could observe a strong effect of the nano-capsules on the fragrance release, 6 and 24 hours after the washing process. The level of the release depended on the nature of the raw material. The measurements were done on dry hair (kept in air at room conditions). The results showed a significant difference between the samples in term of performance. The capsules B-2 improved the slow release of the perfume. The effect seemed to be more important after 24 hours where the release of linalol, citronellol, and carbinol acetate was about 2 times higher (compared to perfumed shampoo without capsules) and the release of verdyl acetate was about ten times higher.

What is claimed is:

1. A method of preparing solid micro- or nano-particles comprising a cross-linked hydrophobic polymer which has been chemically modified to comprise hydrophilic moieties at its surface and optionally in its core, which comprises:

a) dispersing under stirring a hydrophobic monomer in a medium wherein the corresponding polymer is not soluble, said medium further comprising an initiator, a cross-linking agent and at least one stabiliser, thus providing a suspension, dispersion or miniemulsion;

b) heating the suspension, dispersion or miniemulsion at a temperature of between 50 and 90° C., thus inducing polymerization and providing polymeric hydrophobic particles, c) optionally using an excess of an organic solvent to remove un-reacted monomers; and d) adding a chemical agent for chemically modifying the polymeric particles, so as to transform hydrophobic moieties of the polymer formed in step b) into hydrophilic moieties at the surface of the particles and optionally in part of the core of the particles, with the chemical agent being either an acid for transforming ester moieties into carboxylic acid moieties or a quaternisation agent for quaternising amino-moieties into quaternary ammonium moieties, thus forming the solid particles.

2. The method according to claim 1, wherein the monomer used in step a) is selected from the group consisting of an ester of formula (I)

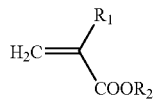

$R_1$ is a hydrogen or an alkyl group having from 1 to 6 carbon atoms and $R_2$ is a linear or branched alkyl group having from 1 to 8 carbon atoms, and a styrene derivative of formula (II)

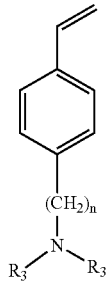

wherein n is an integer, varying from 0 to 3, and $R_3$ is a hydrogen, a methyl, ethyl, propyl or isopropyl group.

3. The method according to claim 2, wherein the monomer used in a) is an ester of formula (I), and the chemical agent used in d) is an acid for transforming ester moieties into carboxylic moieties.

4. The method according to claim 2, wherein the monomer used in a) is a styrene derivative of formula (II), and the chemical agent used in d) is a quaternisation agent for quaternising amino-moieties into quaternary ammonium moieties.

5. The method according to claim 1, wherein the hydrophobic monomer in a) is used in admixture with a second monomer containing tertiary amine groups.

6. The method according to claim 1, wherein the hydrophobic polymer consists of a polyester and the hydrophilic moieties consist of carboxylic moieties.

7. The method according to claim 1, wherein the hydrophobic polymer consists of a poly-styrene polymer and the hydrophilic moieties consist of quaternary ammonium moieties.

8. The method according to claim 1, which further comprises adding a perfuming ingredient to the solid particles.

9. The method according to claim 8, which further comprises forming a perfume delivery system by swelling the solid particles with the perfuming ingredient.

10. The method according to claim 9, wherein the swelled micro-particles comprise up to 80% by weight of perfuming ingredient, relative to the total weight of the ingredient.

11. The method according to claim 9, wherein the swelled particles are obtained by adding an excess of perfuming ingredient over the solid micro- or nano-particles.

12. The method according to claim 9 which further comprises adsorbing a copolymer adsorbed upon the surfaces of the swelled particles.

13. A method for forming a perfumed functional article, which comprises combining the solid particles of claim 1 with functional constituents of a base, and, optionally, with a perfume formulation comprising perfuming ingredients, solvents, or adjuvants of current use in the preparation of a perfume formulation, as perfuming ingredient.

14. The method according to claim 13 wherein the article is provided in the form of an after-shave lotion, a soap, a bath or shower gel, a shampoo or another hair-care product, a cosmetic preparation, a deodorant, an air freshener, a detergent or fabric softener or a household product.

15. The method according to claim 13, wherein the perfumed article is in the form of a detergent or softener comprising at least one surfactant, wherein the solid particles bear a charge at their surface which is opposite to that of the main surfactant of the detergent or softener.

16. A method for forming a perfumed functional article, which comprises combining the perfumed solid particles of claim 8 with functional constituents of a base, and, optionally, with additional perfuming ingredients, solvents, or adjuvants of current use in the preparation of a perfume formulation.

17. The method according to claim 16 wherein the article is provided in the form of an after-shave lotion, a soap, a bath or shower gel, a shampoo or another hair-care product, a cosmetic preparation, a deodorant, an air freshener, a detergent or fabric softener or a household product.

18. The method according to claim 16 wherein the perfumed article is in the form of a detergent or softener comprising at least one surfactant, wherein the solid particles bear a charge at their surface which is opposite to that of the main surfactant of the detergent or softener.

* * * * *